S. HOKE.
Fertilizer.

No. 68,077. Patented Aug. 27, 1867.

Witnesses:
Moses Straus
Chas. L. Anderson

Inventor:
Samuel Hoke
By his Atty
J. F. Reigart

United States Patent Office.

SAMUEL HOKE, OF MOUNT PLEASANT TOWNSHIP, MARYLAND.

Letters Patent No. 68,077, dated August 27, 1867.

IMPROVEMENT IN MACHINE FOR DISTRIBUTING FERTILIZERS.

*The Schedule referred to in these Letters Patent and making part of the same.*

TO ALL WHOM IT MAY CONCERN:

Be it known that I, SAMUEL HOKE, of Mount Pleasant township, Frederick county, State of Maryland, have invented an "Improved Fertilizer;" and I do hereby declare the following to be an exact description thereof, reference being had to the accompanying drawings, and to the letters of reference marked thereon, making a part of this specification, in which—

Figure 1:
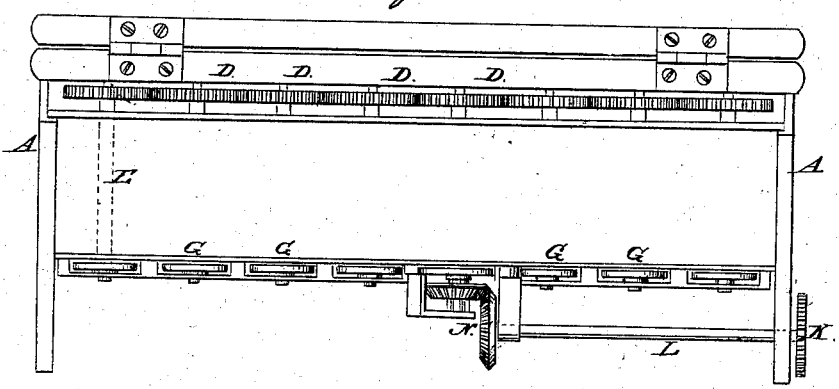

Figure 1 is a side elevation of the hopper, with sowing devices.

Figure 2:
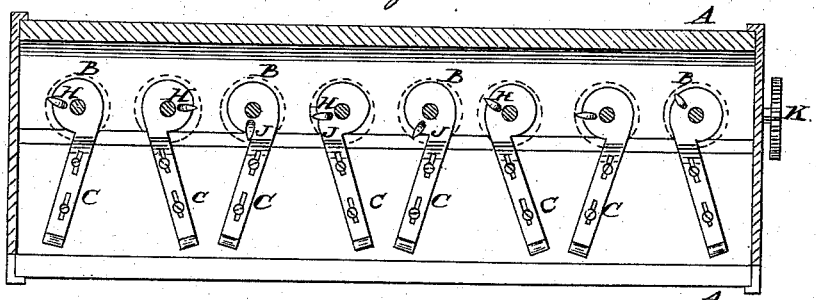

Figure 2, a top view of the same.

Figure 3:
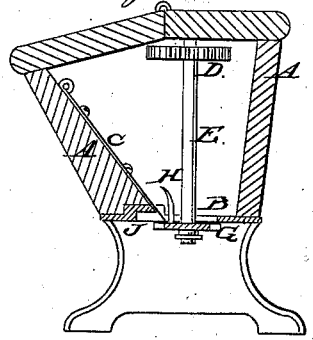

Figure 3, a cross-section.

The nature of my invention consists in the shape and construction of the lower sowers with their curved upright stirrers, as operating to the one side of the centre of an eccentric aperture, so as to keep the guano or fertilizing substances continually discharging at the aperture in the bottom of the hopper.

A represents the hopper containing the fertilizer. In the bottom of this hopper are eccentric-shaped apertures B B, in the one side of which the guano discharges, regulated by cut-offs C C, that are slides operating on the inside of the front of the hopper. Above each aperture B a series of toothed wheels, D D, revolves on their upright shafts E E, and on the lower ends of these shafts E are plain wheels, G G, that are located and operated on the lower side of the apertures B. On the upper sides of these wheels G the stirrers H are fastened, travelling around with the wheels G, and moving eccentric to the centre of the apertures B, so as to keep the guano continually falling through the discharge apertures J, and completely prevent the guano from choking, the stirrer at each revolution moving and revolving closer to the discharge aperture J what it collects on the wheel G on the opposite side of aperture J. The main driving-wheel K propels the shaft L, that propels the bevel gearing N, that operate the toothed wheels D with their shafts E, and their wheels G with their stirrers H, all revolving regularly, the curved point of each stirrer revolving out from the centre shaft E.

What I claim as my invention, and desire to secure by Letters Patent, is—

The shape and construction of the stirrers H, with their lower wheels G operating in eccentric apertures B, when arranged and operated as herein described and for the purposes set forth.

SAMUEL HOKE.

Witnesses:
J. FRANKLIN REIGART,
JOHN S. HOLLINGSHEAD.